United States Patent
Armstrong et al.

(10) Patent No.: US 9,821,869 B2
(45) Date of Patent: Nov. 21, 2017

(54) CONNECTION DEVICE FOR A PANNIER

(71) Applicant: Thule IP AB, Malmö (SE)

(72) Inventors: Timothy Armstrong, Dunedin (NZ); Gary Gibson, Dunedin (NZ); Patrick David Maguire, Dunedin (NZ)

(73) Assignee: Thule IP AB, Malmö (SE)

(*) Notice: Subject to any disclaimer, the term of this patent is extended or adjusted under 35 U.S.C. 154(b) by 0 days.

(21) Appl. No.: 14/414,310

(22) PCT Filed: Jun. 28, 2013

(86) PCT No.: PCT/EP2013/063580
§ 371 (c)(1),
(2) Date: Jan. 12, 2015

(87) PCT Pub. No.: WO2014/009171
PCT Pub. Date: Jan. 16, 2014

(65) Prior Publication Data
US 2015/0197301 A1    Jul. 16, 2015

(30) Foreign Application Priority Data
Jul. 13, 2012 (EP) .................................... 12176423

(51) Int. Cl.
*B62J 9/00* (2006.01)
*B60R 9/02* (2006.01)

(52) U.S. Cl.
CPC .............. *B62J 9/00* (2013.01); *B60R 9/02* (2013.01); *B62J 9/001* (2013.01)

(58) Field of Classification Search
CPC ............... B60R 9/02; B62J 9/00; B62J 9/001
(Continued)

(56) References Cited

U.S. PATENT DOCUMENTS 2,539,381 A * 1/1951 Bachmann ................. B62J 7/04
                                                      224/424
2,697,479 A * 12/1954 Fesler ................... B60N 2/4673
                                                      224/275
(Continued)

FOREIGN PATENT DOCUMENTS

CA        2 316 508         2/2002
CA        2316508 A1 *      2/2002 ........... A45C 7/0086
(Continued)

OTHER PUBLICATIONS

International Search Report and Written Opinion of the International Searching Authority for International No. PCT/EP2013/063580, European Patent Office, The Netherlands, dated Oct. 8, 2013, 10 pages.

*Primary Examiner* — Nathan J Newhouse
*Assistant Examiner* — Phillip Schmidt
(74) *Attorney, Agent, or Firm* — Sterne, Kessler, Goldstein & Fox P.L.L.C.

(57) ABSTRACT

The present invention relates to a connection device for a pannier for a vehicle and a pannier having such a connection device. The connection device includes a pivotable support member having an attachment arrangement for attaching to the vehicle. The pivotable support member is adapted to be pivoted between an attachment position, in which the attachment arrangement is exposed for attachment to the vehicle, and a concealed position. The present invention provides a connection device having an attachment arrangement. The attachment arrangement can be displaced so as not to interfere with objects, e.g., getting snared or caught.

20 Claims, 5 Drawing Sheets

(58) Field of Classification Search
USPC ....... 224/430, 431, 549, 428, 429, 441–443, 224/417, 547, 548, 553, 558; 190/102, 190/124
See application file for complete search history.

(56) References Cited

U.S. PATENT DOCUMENTS

| | | | | |
|---|---|---|---|---|
| 3,937,374 A * | 2/1976 | Hine, Jr. | | B62J 9/00 224/417 |
| 3,995,803 A * | 12/1976 | Uitz | | B62J 7/06 224/417 |
| 4,096,980 A * | 6/1978 | Clow | | B62J 11/00 224/413 |
| 4,174,795 A * | 11/1979 | Jackson | | B62J 9/00 224/417 |
| 4,353,490 A * | 10/1982 | Jackson | | B62J 9/00 224/417 |
| 4,355,746 A * | 10/1982 | Casady | | A63B 55/60 211/100 |
| 4,387,835 A * | 6/1983 | Golzer | | B62J 9/00 220/771 |
| 4,418,850 A * | 12/1983 | Jackson | | B62J 9/00 224/417 |
| 4,442,960 A * | 4/1984 | Vetter | | B62J 9/00 190/108 |
| 4,460,114 A * | 7/1984 | Grenier | | B62J 9/00 224/430 |
| 4,480,773 A * | 11/1984 | Krauser | | B62J 7/00 211/150 |
| 4,516,705 A * | 5/1985 | Jackson | | B62J 9/00 224/430 |
| 4,577,786 A * | 3/1986 | Dowrick | | B62J 9/00 224/417 |
| 4,869,408 A * | 9/1989 | Lutz | | A45C 3/00 206/287.1 |
| 4,934,894 A * | 6/1990 | White | | B60R 9/06 224/492 |
| 5,024,359 A * | 6/1991 | Thomas | | B62J 7/06 224/414 |
| 5,152,440 A * | 10/1992 | Chao | | B60R 7/00 224/277 |
| RE34,474 E * | 12/1993 | Lutz | | A45C 3/004 206/287.1 |
| 5,435,471 A * | 7/1995 | Chuang | | B62J 9/00 224/419 |
| 5,579,971 A * | 12/1996 | Chuang | | B62J 9/001 224/430 |
| 5,609,278 A * | 3/1997 | Fresco | | A45C 5/14 224/153 |
| 5,678,796 A * | 10/1997 | James | | E04H 6/04 135/88.1 |
| 5,765,733 A * | 6/1998 | Brule | | A45F 3/04 224/153 |
| 5,769,294 A * | 6/1998 | Heinz | | B60R 7/02 224/544 |
| 5,810,230 A * | 9/1998 | Nutto | | B62J 9/00 224/417 |
| 6,053,384 A * | 4/2000 | Bachman | | B62J 9/001 224/413 |
| 6,460,746 B1 * | 10/2002 | Amram | | A45F 3/047 224/579 |
| 7,160,028 B1 * | 1/2007 | Linday | | A45C 9/00 150/108 |
| 7,322,467 B2 * | 1/2008 | Youngblood | | A47K 10/421 206/233 |
| 7,568,600 B2 * | 8/2009 | Godshaw | | B62J 9/008 224/429 |
| 7,775,411 B2 * | 8/2010 | Campbell | | B62J 7/04 224/42.4 |
| 8,028,877 B2 * | 10/2011 | Lien | | B62J 9/001 224/417 |
| 8,292,139 B2 * | 10/2012 | Golub | | B62J 7/08 224/419 |
| 2002/0108981 A1 * | 8/2002 | Smith | | A45C 7/0045 224/427 |
| 2005/0161483 A1 * | 7/2005 | Krohn | | B62J 9/006 224/413 |
| 2009/0308903 A1 * | 12/2009 | Vigeant | | B62J 7/08 224/431 |
| 2010/0012696 A1 * | 1/2010 | Prager | | B62J 9/005 224/417 |
| 2012/0255983 A1 * | 10/2012 | Semone | | A45F 3/04 224/585 |

FOREIGN PATENT DOCUMENTS

| | | | |
|---|---|---|---|
| DE | 195 21 083 | 12/1996 | |
| DE | 202006017966 U1 * | 2/2007 | |
| DE | WO 2010034303 A1 * | 4/2010 | ............ B62J 7/08 |
| GB | 1 317 448 | 5/1973 | |
| GB | 1317448 A * | 5/1973 | ............ B62J 9/00 |
| JP | 2002 255073 | 9/2002 | |
| JP | 2003 220987 | 8/2003 | |

* cited by examiner

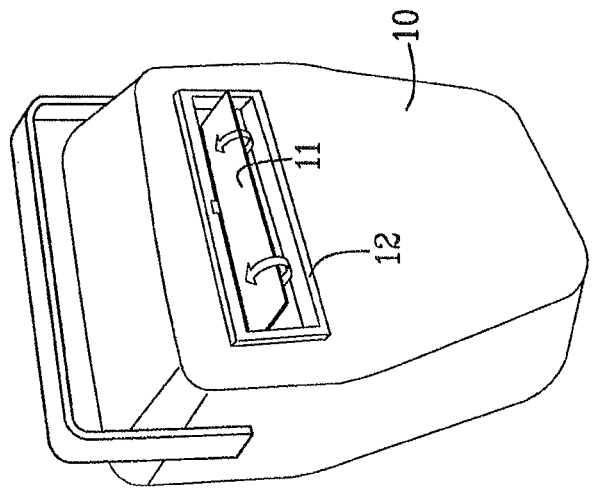
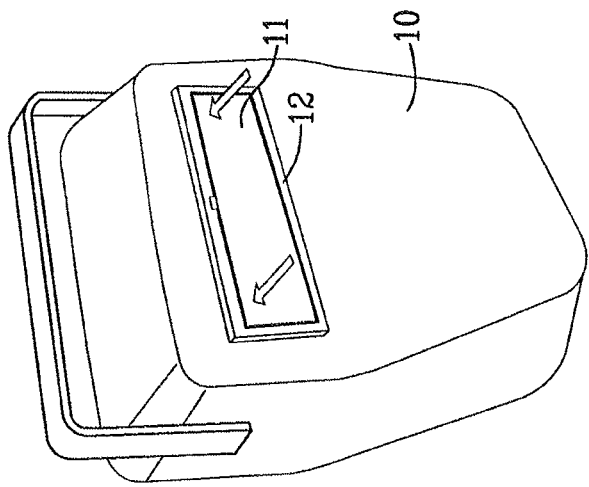
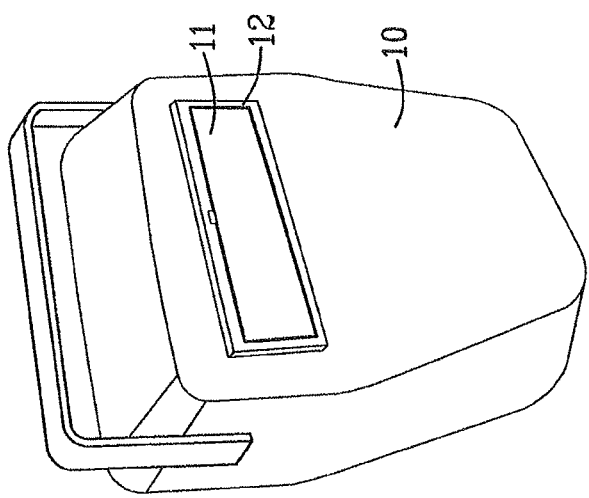

CONNECTION DEVICE FOR A PANNIER

TECHNICAL FIELD

The present invention relates to a connection device for a pannier, to attach the pannier top a vehicle such as a bicycle. The connection device comprises an attachment arrangement which can be positioned between an operable position and an inoperable position.

BACKGROUND OF THE INVENTION

Panniers for bicycles, motorbikes or other vehicles are widely used and are attached to the vehicle using an attachment arrangement. When a pannier is removed from the vehicle, the attachment arrangement is usually considered to be more of a nuisance than an asset.

The European patent No. EP 0,876,951 B1 discloses a device for attaching a bag to a bar. The device comprises two retaining clips which are rotatably mounted about an axis respectively, to enable attachment to the bar. The axes of rotation are arranged a distance from the bar which the bag is intended to be connected to. The retaining clips are relatively space consuming and run the risk being snared, or caught, in clothes or other accessories. There is also a need to improve the attachment mechanism.

SUMMARY

It is an object of the present invention to provide an improved pannier which at least reduces one or more of the drawbacks of the prior art, or at least to provide a useful alternative. The object is at least partly met by a connection device for a pannier adapted to be attached to an object such as a vehicle or a person, directly or indirectly via e.g. straps or the like. The vehicle could be a bicycle, snow scooter, motorcycle, jet ski, sailing boat, motor boat or the like. The connection device comprises a pivotable support member comprising an attachment arrangement for attaching to the vehicle. The pivotable support member is adapted to be pivoted between an attachment position, in which the attachment arrangement is exposed for attachment to the vehicle, and a concealed position in which the attachment arrangement is in a non-operable position. The term "pannier" is not by itself limited to any specific form or shape, as such, any bag could be considered to be a pannier in its broadest aspects.

The connection device enables a pannier to be used as an ordinary bag, rucksack, messenger bag, or the like, without having the attachment arrangement exposed in an operable position, whereby the risk for clothes or other items getting snared or caught is reduced. A user can simply choose to displace the support member between the attachment position and the concealed position dependent on the intended use of the pannier. If a user would like to transport goods using the pannier, the user simply put the support member to the transport position, at which the attachment arrangement is exposed and can be used to attach the pannier to an object such as a bicycle, or any other vehicle or person. When the user arrives at the intended destination, the user can release the pannier from the object e.g. vehicle, and displace the support member and thus conceal the attachment arrangement.

According to a second aspect, the object is to provide an improved connection device for a pannier for an object such as a vehicle or a person. The vehicle could be a bicycle, snow scooter, motorcycle, jet ski, sailing boat, motor boat or the like. The connection device comprises a support member comprising an attachment arrangement for attaching to the object. According to an aspect, the attachment arrangement comprises at least one attachment member. The at least one attachment member is adapted to attach to the object by a rotational movement between an unlocked position and a locked position. In the lock position, the attachment member engages the object in a retaining manner. In the unlocked position, the attachment member, and thus the connection device, can be removed from the object. The attachment arrangement can comprise one or more attachment members, e.g. two, or two or more, attachment members. According to an aspect, the connection device comprises a first and second attachment member, the first and the second attachment members are aligned along a first axis and adapted to attach to a rod, or any other elongated member, on the object, the rod being aligned with the first axis.

The pivotable support member can be pivotally connected to a housing, in which the attachment arrangement is at least partly encompassed by the housing when the pivotable support member is in the concealed position.

According to an aspect, the attachment arrangement comprises at least one attachment member. The at least one attachment member is adapted to attach to the vehicle by a rotational movement between an unlocked position and a locked position. In the lock position, the attachment member engages the vehicle in a retaining manner. In the unlocked position, the attachment member, and thus the connection device, can be removed from the vehicle. The attachment arrangement can comprise one or more attachment members, e.g. two attachment members. The attachment arrangement can be used to attach the pannier to an object such as a vehicle or a person. If the pannier is to be attached to a person, the attachment arrangement can be used to attach a carrier arrangement, such as rucksack straps or the like.

According to an aspect, the at least one attachment member is displaceably arranged to the pivotable support member. By having displaceable attachment members with respect to the pivotable support member, the connection device can be adapted to be attached to many different vehicles and different vehicle sizes or models. This is especially the case if the support member comprises two attachment members and at least one of them are displaceably attached optionally both of them are displaceable attached. The attachment member(s) can be slideably displaceably attached, or being adapted to be attached at pre-selected positions.

According to an aspect, the connection device comprises a first and second attachment member, the first and the second attachment members are arranged in a row, i.e. aligned along a first axis, and adapted to attach to a rod, or any other elongated object, on the vehicle, the rod being aligned with the first axis. It is of course possible that the first and the second attachment members are used to be attached at two individual sites or positions, and not to a rod on the object. Each of the attachment members can comprises a slot adapted for receiving the rod, or the elongated object. When the rod is aligned with the first axis, and the first and the second attachment members is positioned in the unlocked position, the slots are aligned with the first axis and the rod can thus be inserted into the slot of the first and the second attachment members.

According to an aspect, the first and second attachment members are aligned along a first axis, and the pivotable support member is adapted to pivot about the first axis between the attachment position and the concealed position.

A small and compact attachment arrangement is provided by aligning the first and the second attachment members with the pivot axis. Optionally or additionally, the first and second attachment members are adapted to rotate about a first and a second rotation axis respectively, the first and the second rotation points are positioned so that they substantially intersect with the first axis.

According to an aspect, the first and second attachment members are connected by a string or handle, the string or handle is configured to impart the first and the second attachment members a rotational motion when being pulled.

According to an aspect, one, or both of the first and the second attachment members, is/are adapted to be displaced between the unlocked position and a locked position using a rotational movement of the first and/or the second attachment member. For example, the first attachment member can be imparted with a rotational movement in a first direction, and the second attachment member can be imparted with a rotational movement in a second direction. The first direction is opposite of the second direction, e.g. the first direction can be clockwise and the second direction could be anti-clock wise, or vice versa. A wire, string, or handle, can be used to impart the rotational movement to the first and/or the second attachment members. Optionally the first and/or the second attachment member are biased, or at least spring loaded, back towards the locked position.

According to an aspect, the pivotable support member comprises a first and a second side. The attachment arrangement is slideably arranged to the first side of the pivotable support member. The second side is advantageously a smooth flat surface. It is advantageous the second side of the pivotable support member is formed in accordance with the fashion of the pannier to which it is intended to be attached to.

According to an aspect, the pivotable support member comprises at least one slide track, and the at least one attachment member is adapted to slide in the at least one slide track. The attachment member can be displaced by a sliding motion between a substantially infinite number of positions, or between a numbers of preselected, or predetermined positions.

According to an aspect, the housing can be a rigid housing, i.e. formed by a rigid material. The housing can optionally in some cases be formed by a soft shell, i.e. a flexible material.

According to an aspect, the pivotable support member is pivotally arranged to the housing so as to form a pivotable lid to a void defined by the housing.

According to an aspect, the object is a vehicle such as a bicycle, snow scooter, motorcycle, Jet Ski, sailing boat, motor boat or the like.

It is also within the boundaries that embodiments of the present invention includes a pannier comprising a connection device as described herein according to different aspects, or according to any one of the appended claims.

The attachment arrangement of the pivotable support member can be pivoted into the pannier and out from the pannier.

BRIEF DESCRIPTION OF THE DRAWINGS

Non limiting embodiments of the present invention will be described in greater detail with reference to the accompanying figures in which;

FIG. 1 shows a pannier comprising a connection device according to an embodiment, the pivotable support member being in a concealed position;

FIG. 2 shows the pannier of FIG. 1, the pivotable support member being in an attachment position;

FIGS. 2a-2b show the pivotable support member being pivoted from the concealed position to the attachment position;

DETAILED DESCRIPTION OF PREFERRED EMBODIMENTS

FIG. 1 shows a pannier 10 for a bicycle (not shown). The pannier 10 can be attached directly to the vehicle, such as a bicycle or, as will be shown and described herein, attached to a bicycle rack, which in turn is attached to a bicycle. The vehicle can be a bicycle, motorcycle, snow scooter, Jet Ski, kayak, sailing boat, motor boat, or similar vehicles may require additional load carrying capabilities. The pannier 10 is preferably a bicycle pannier.

Figure 3A:
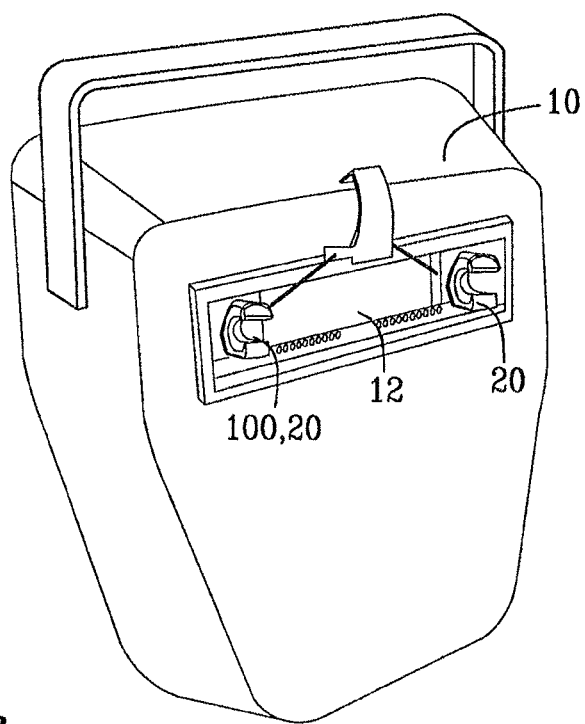
FIGS. 3a-3b show the pivotable support member being pivoted from the attachment position to the concealed position.
Figure 3B:
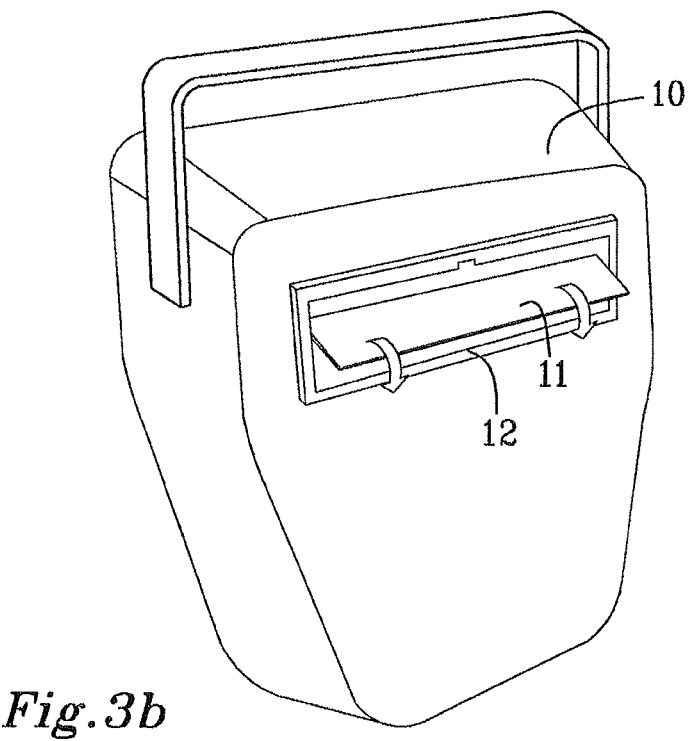

The pannier 10 can be attached to the bicycle via a connection device 100 comprising an attachment arrangement 20 arranged on a pivotable support member 11. FIGS. 2a-3b show how the pivotable support member 11 can be pivoted and positioned in an attachment position, at which the attachment arrangement 20 is exposed and in an operable position as seen in FIG. 3a, and a concealed position as seen in FIG. 2a, in which the attachment arrangement 20 is concealed from view and in a non-operable position. The pivotable support member 11 is pivotally connected to a housing 12 as will be described in greater detail below. The attachment arrangement 20 can thus be concealed and will not suffer from the risk of getting snared or caught when not in use. The pannier 10 can further be carried as a rucksack for example, as no protruding parts will interfere with a user while carrying the pannier 10 on his/hers back.

Figure 4A:
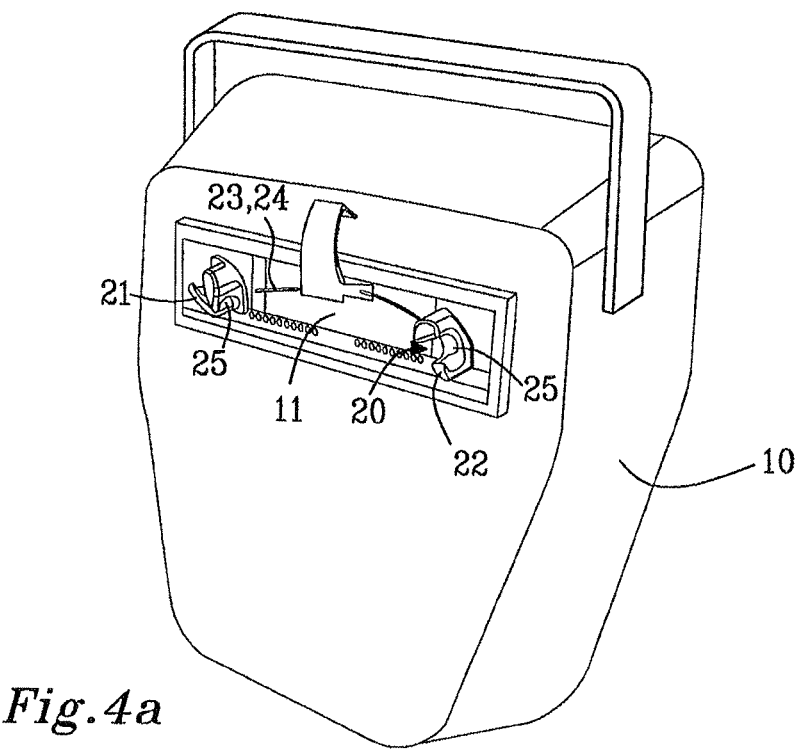
FIG. 4a-4b show the connection device during attachment of a pannier to the rod of a bicycle rack.
Figure 4B:
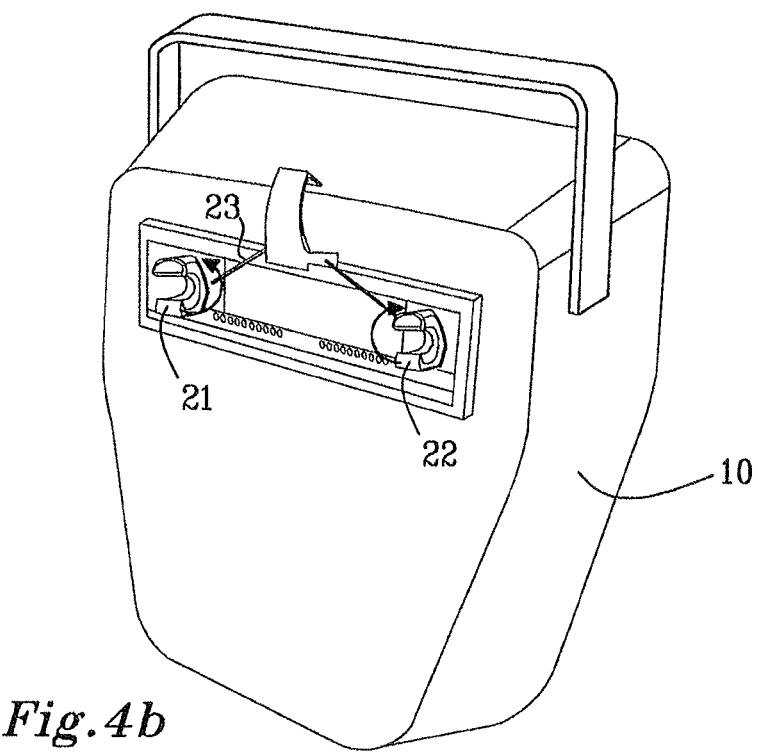

FIG. 4a shows the pannier 10 with the pivotable support member 11 in the attachment position, the attachment arrangement 20 is in an operable position and ready to be attached to a bicycle rack. The pivotable support member 11 can be pivoted at least 180 degrees about an axis A (shown in FIG. 5), or at least 360 degrees. In the shown embodiment, the pivotable support member 11 can be pivoted 180 degrees about the axis A. The attachment arrangement 20 comprises a first and a second attachment member 21, 22 which provides for a first and second attachment point to the bicycle rack. The first and the second attachment members 21, 22 are operated via flexible member 23, in this case a wire 24, which upon being pulled rotates the first and the second attachment members 21, 22 counter clock-wise and clock-wise respectively, which is illustrated with arrows in FIG. 4b. When the wire 24 is released the first and the second attachment members 21, 22 are biased towards their original position.

Figure 5:
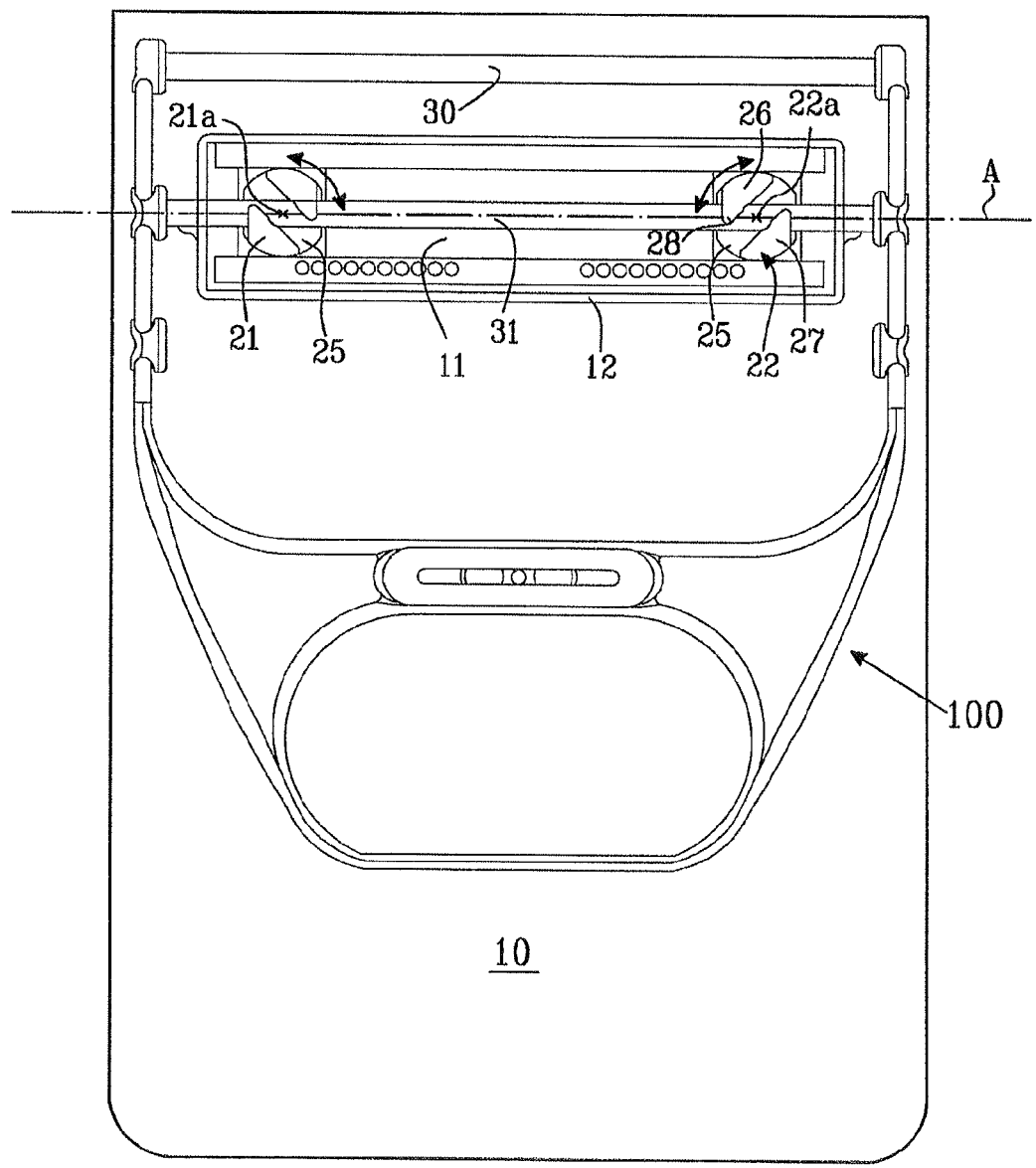
FIG. 5 shows the connection device in greater detail, the pivotable support member being in the attachment position and attached to a rod of e bicycle rack.

FIG. 5 shows the attachment arrangement 20 in greater detail and parts of the bicycle rack 30 to which the pannier 10 is attached. Each attachment member 21, 22 comprise an insertion slot 25 through which a rod 31 of the bicycle rack 30 can be inserted through. The insertion slots 25 of the first and the second attachment members 21, 22 are in the shown embodiment aligned when pulling the flexible member 23, in FIG. 5 aligned with an axis A. The insertion slot 25 is formed between a first and a second protruding member 26, 27, which each comprises a lock flange 28. When the flexible member 23 (not shown in FIG. 5) is pulled, the insert slots 25 are aligned with the axis A, enabling the rod 31 to be inserted into the insertion slots 25. As the flexible member 23 is released, the first and the second attachments members 21, 22 rotates back to substantially their original position, a lock position, at which the lock flanges 28 grips about the rod 31 and intersects with the axis A in an locking manner. Each attachment member 21, 22 comprises a rotation axis 21A, 22A about which the first and the second attachment member 21, 22 is adapted to rotate. As is noted, the rotation axes 21A, 22A are positioned so that they substantially intersect with the axis A. Advantageously, the rotation axes 21A, 22A are substantially perpendicular to the axis A and substantially intersecting with the axis A, or intersecting with the axis A.

Figure 6:
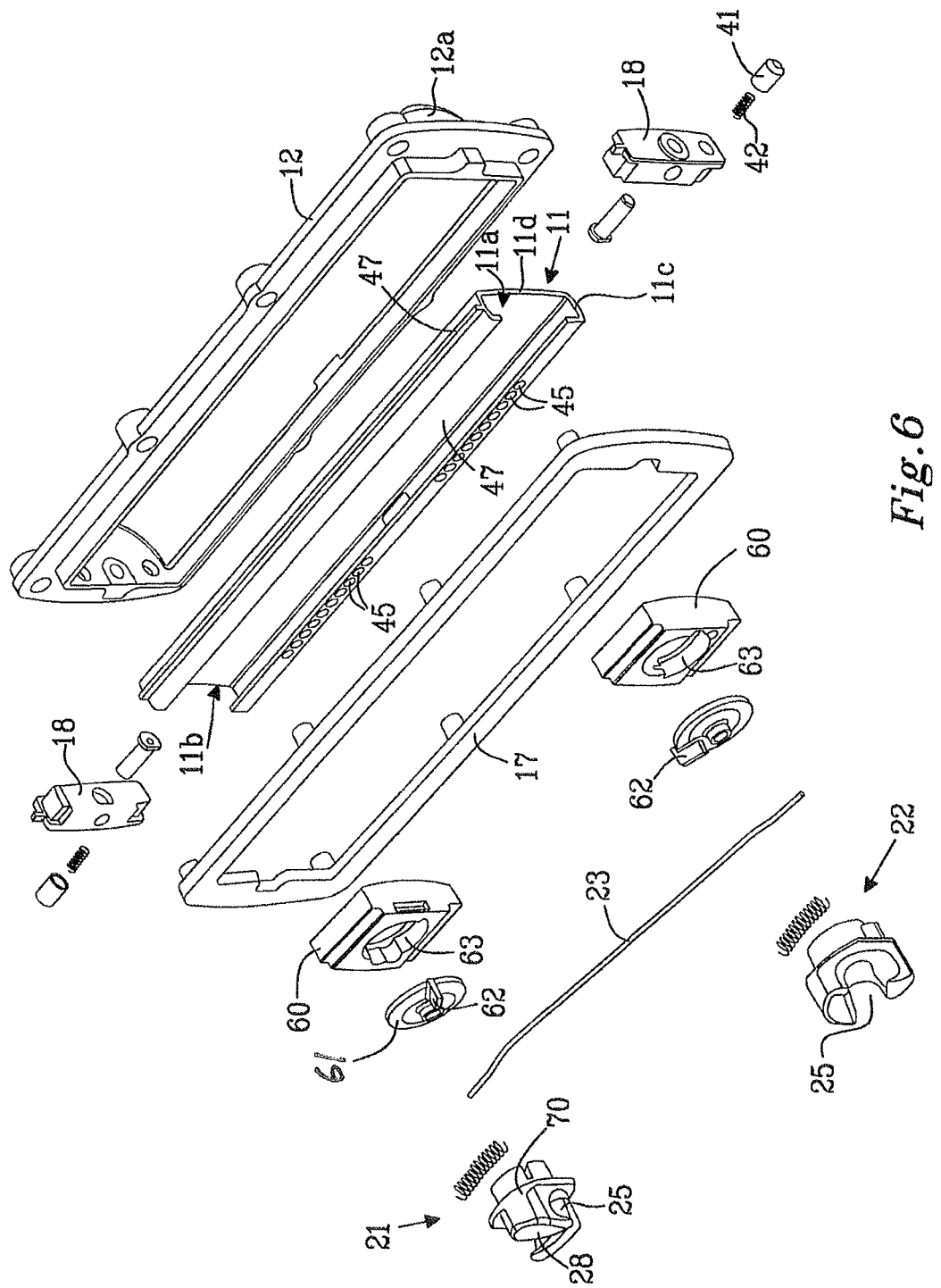
FIG. 6 is an exploded view of an embodiment of the connection device shown in FIG. 5.

FIG. 6 is an exploded view of the pivotable support member 11 and the housing 12 in greater detail. The housing 12 forms a cartridge like structure, which can be inserted and attached to the pannier 10 as a cartridge or separate module. FIG. 6 shows the pivotable support member 11, the housing 12, parts of the pannier 10 in the form of a pannier wall 15 comprising an opening 16, a rim 17 for connecting the housing 12 to the wall 15 of the pannier 10. A support member end piece 18 is arranged at each end 11a, 11b of the pivotable support member 11. The support member end pieces 18 are arranged with a pivot pin 40 about which the pivotable support member 11 is configured to pivot between the operable position and the concealed position. A lock pin 41, biased by a spring 42, locks the pivotable support member 11 at the operable position and the concealed position.

The pivotable support member 11 is in the shown embodiment formed by extruded aluminum but could of course be manufactured in other materials such as wood, plastics or the like. It could be transparent or made partly, or non-transparent. Independently of the transparency of the pivotable support member it would still be considered to conceal the attachment arrangement. The pivotable support member 11 comprises a C-shaped cross section in which the first and the second attachment members 21, 22 (not shown in FIG. 6) can be slidably displaced. A number of apertures 45 in one of the flanges 46 at the opening of the pivotable support member 11 provides for a number of preselected positions for the first and the second attachment members 21, 22 so that the pannier 10 can be attached to a wide variety of sizes and models of bicycles and bicycle racks. The pivotable support member 11 can be formed by a transparent material, such as a transparent plastic material, and still conceal the attachment arrangement. If the pivotable support member is formed by a non-transparent material, the attachment arrangement 20 will be fully concealed, unless there are apertures in the pivotable support member 11 or if the housing 12 or the pannier 10 itself permits viewing of the attachment arrangement 20. Independently of whether the attachment arrangement is concealed or fully concealed, the attachment arrangement 20 is removed from the outer surface of the pannier 10 and thus positioned in a non-operable position.

As is noticed, the housing 12 comprises a radially curved wall 12a permitting the pivotable support member 11 to rotate. The housing 12 is advantageously manufactured in substantially rigid material, such as aluminum, wood or wood based materials, thermoplastics e.g. polyethylene, polypropylene, polyurethane or mixtures thereof.

In the shown embodiment, the attachment arrangement comprises a first and a second attachment member 21, 22. Only the first attachment member 21 will be described herein, the second attachment member 22 is however of the same type as the first attachment member 21, although in some embodiments it is possible that the first and the second attachment members are of different types. As mentioned, each attachment member 21, 22 comprise an insertion slot 25 through which an elongated element, such as a rod of a bicycle rack can be inserted.

The pivotable support member comprises a first and a second side 11c, 11d. The attachment arrangement is slideably arranged to the first side 11c of the pivotable support member. The second side 11d is advantageously a smooth flat surface. It is advantageous is the second side of the pivotable support member is formed in accordance with the fashion of the pannier to which it is intended to be attached to as is shown in FIG. 1 for example. The second side 11d can be substantially aligned with the outer surface of the pannier for example.

The first attachment member 21 is rotateably attached to a sliding member 60 which is slideably attached to the pivotable support member 11, in this case in the slide tracks 47 formed by the C-shaped cross section of the pivotable support member 11. A spring member biases the first attachment member 21 towards a first position, in which the lock flanges 28 are adapted to grip about an elongated element in a locking manner. A disc 61 comprising a stop flange 62 arranged substantially perpendicular to the plane of the disc 61. The stop flange 62 slides in a track 63 in the sliding member 60 as the flexible member 23 is pulled, and provides to a distinct stop the to the rotation of the first attachment member 21 as the track 63 of the sliding member 60 ends. At the mentioned stop position, the insert slots 25 are aligned enabling an elongated element to be inserted into the insertion slots 25 and thus attached to the first and the second attachment member 21, 22.

The insertion slots 25 of the first and the second attachment members 21, 22 are in the shown embodiment aligned when pulling the flexible member 23. As the flexible member 23 is released, the first and the second attachments members 21, 22 rotate back to substantially their original position, a lock position.

The invention claimed is:

1. A pannier, comprising:
   a pannier wall having an opening;
   a housing having a rim and a curved wall extending away from the rim, wherein the housing is coupled to the opening;
   a pivotable support member pivotably coupled to the housing; and
   an attachment member coupled to the pivotable support member and configured to attach the pannier to a vehicle,
   wherein the pivotable support member is configured to pivot between an attachment position, in which the attachment member is exposed for attachment to the vehicle, and a concealed position, in which the attachment member is disposed in a void space between the pivotable support member and the curved wall of the housing.

2. The pannier according to claim 1, wherein the rim is coupled to an outer surface of the pannier wall.

3. The pannier according to claim 1, wherein the curved wall is disposed in an interior of the pannier.

4. The pannier according to claim 1, wherein the housing is disposed through the opening.

5. The pannier according to claim 1, wherein the attachment member comprises a first protruding member and a second protruding member defining an insertion slot between the first protruding member and the second protruding member.

6. The pannier according to claim 5, wherein the attachment member is configured to rotate about a rotation axis perpendicular to a pivot axis of the pivotable support member.

7. The pannier according to claim 6, further comprising:
a second attachment member configured to rotate about a second rotation axis perpendicular to the pivot axis of the pivotable support member; and
a wire connecting the attachment member and the second attachment member.

8. The pannier according to claim 7, wherein pulling the wire imparts a rotational movement to the first and second attachment members.

9. The pannier according to claim 1, wherein the vehicle is a bicycle.

10. A pannier, comprising:
an outer surface having an opening to an interior of said pannier defined by said outer surface; and
a connection device, comprising:
a housing disposed in said opening, said housing comprising:
a rim coupled to said outer surface of said pannier, and
an interior wall coupled to said rim and defining a confined void, wherein said interior wall extends into said interior of said pannier; and
a pivotable support member coupled to said housing and comprising an attachment arrangement for attaching said pannier to a vehicle,
wherein said pivotable support member is adapted to pivot between an attachment position, in which said attachment arrangement is exposed for attachment to said vehicle, and a concealed position, in which said attachment arrangement is in a non-operable position,
wherein said pivotable support member is pivotally arranged to said housing so as to form a pivotable lid to said confined void, wherein said confined void is between said pivotable support member and said interior wall of said housing, and
wherein said attachment arrangement is encompassed within said confined void when said pivotable support member is in said concealed position.

11. The pannier according to claim 10, wherein said attachment arrangement comprises at least one attachment member, said at least one attachment member being adapted to attach to said vehicle by a rotational movement between an unlocked position and a locked position at which said attachment member engages said vehicle in a retaining manner.

12. The pannier according to claim 10, wherein said attachment arrangement comprises first and second attachment members aligned along a first axis, and wherein said first and second attachment members are adapted to attach to an elongated element on said vehicle, said elongated element being aligned with said first axis.

13. The pannier according to claim 12, wherein said pivotable support member is adapted to pivot about said first axis between said attachment position and said concealed position.

14. The pannier according to claim 12, wherein said first and second attachment members are adapted to rotate about a first rotation axis and a second rotation axis, respectively, and wherein said first and said second rotation axes intersect with said first axis.

15. The pannier according to claim 12, wherein said first and second attachment members are connected by a wire, said wire being configured to impart a rotational movement to said first and said second attachment member, enabling said first and said second attachment members to be displaced between an unlocked position and a locked position.

16. The pannier according to claim 10, wherein said interior wall is radially curved.

17. The pannier according to claim 10, wherein said rim is disposed on said outer surface of said pannier.

18. The pannier according to claim 10, wherein said pivotable support member comprises a first and a second side, said attachment arrangement being slideably arranged to said first side of said pivotable support member.

19. The pannier according to claim 18, wherein said second side of said pivotable support member is a flat surface.

20. The pannier according to claim 10, wherein said vehicle is a bicycle, snow scooter, motorcycle, jet ski, sailing boat, or motor boat.

* * * * *